July 2, 1940.   C. A. COMBS   2,206,835
WELL CONTROL EQUIPMENT
Filed Nov. 27, 1937   2 Sheets-Sheet 1

Chester A. Combs,
By Barry & Cyr.
Attorneys

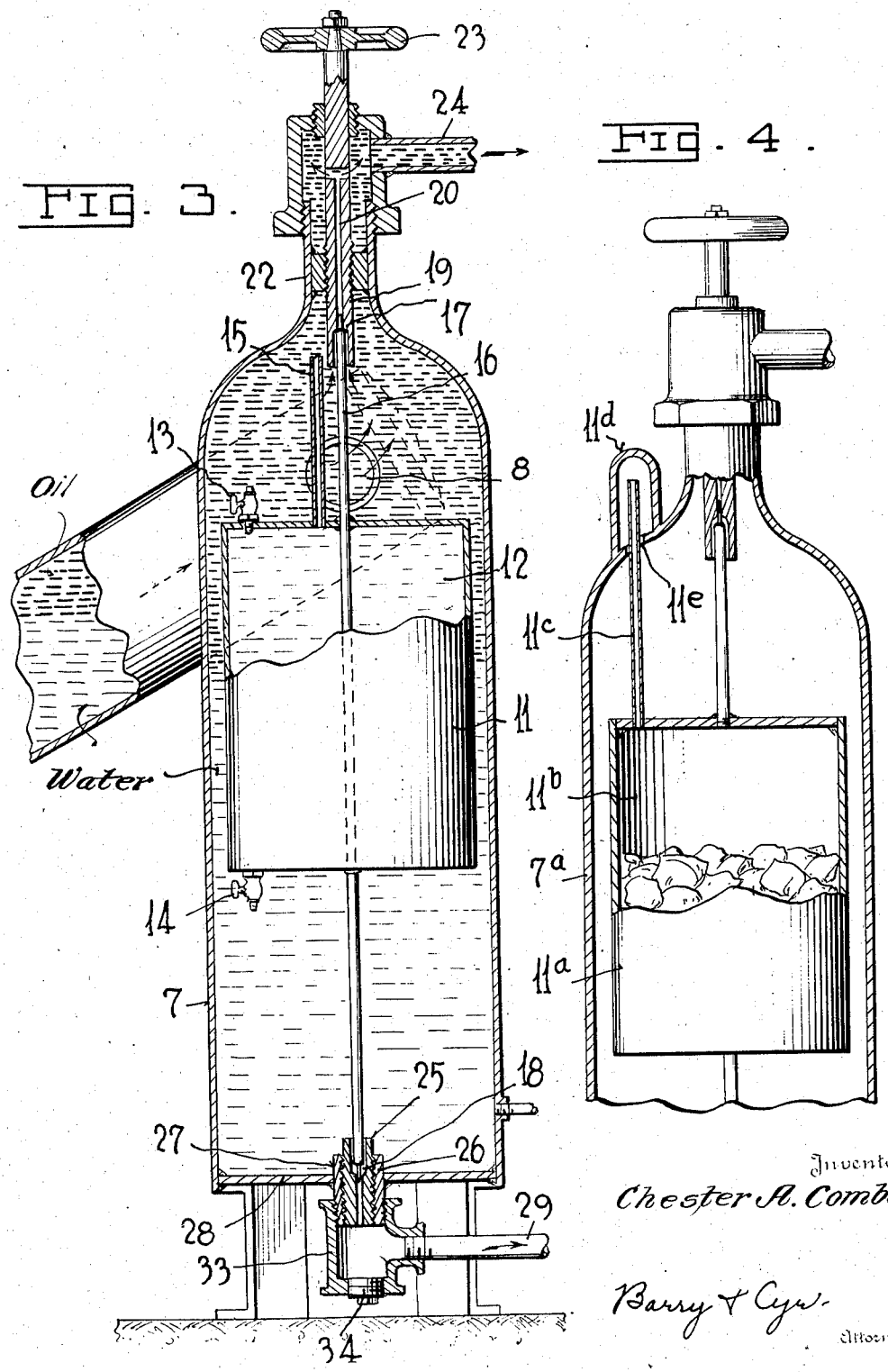

Patented July 2, 1940

2,206,835

UNITED STATES PATENT OFFICE 2,206,835

WELL CONTROL EQUIPMENT

Chester A. Combs, Conroe, Tex., assignor of fifty-one and two-thirds per cent to Julius C. Foretich, Conroe, Tex., and forty-eight and one-third per cent to Mrs. J. C. Shelton Application November 27, 1937, Serial No. 176,845

6 Claims. (Cl. 210—54)

This invention relates to improvements in control devices for wells and more particularly to a novel control device for separating water from oil flowing under natural pressure.

In producing an oil well it is necessary to comply with proration laws, and therefore wells have usually been controlled by choke beams or choking devices of various sizes. Such method would be very satisfactory if the well produced only oil and gas, but many of them produce a quantity of water. As the oil and water pass through the choke together, ofttimes under considerable pressure, an emulsion is formed and this makes it necessary to subsequently separate the water from the oil. Generally this was accomplished by using certain chemicals or heat, or both; the chemical being introduced in the line by a so-called lubricator or being introduced into the storage tank. The mixture of oil and water before entering storage is passed through a heater and in some cases heated to the boiling point. The chemical and heat break down the emulsion and restore the oil and water to their original condition.

The primary purpose of my invention is to eliminate the chemical and/or heat treatment by separating the water and oil before either reaches the choke; thus preventing an emulsion from forming. Heretofore it has been proposed to accomplish such result but so far as I am aware, the means are manually controlled, whereas in accordance with my invention, the control is automatic.

With the foregoing object outlined and with other objects in view which will appear as the description proceeds, the invention consists in the novel features hereinafter described in detail, illustrated in the accompanying drawings, and more particularly pointed out in the appended claims.

In the drawings:

Fig. 3 is a vertical section partly in elevation of one form of float valve which may be used in my control apparatus.

Fig. 4 is a similar view of another method.

Figure 1:
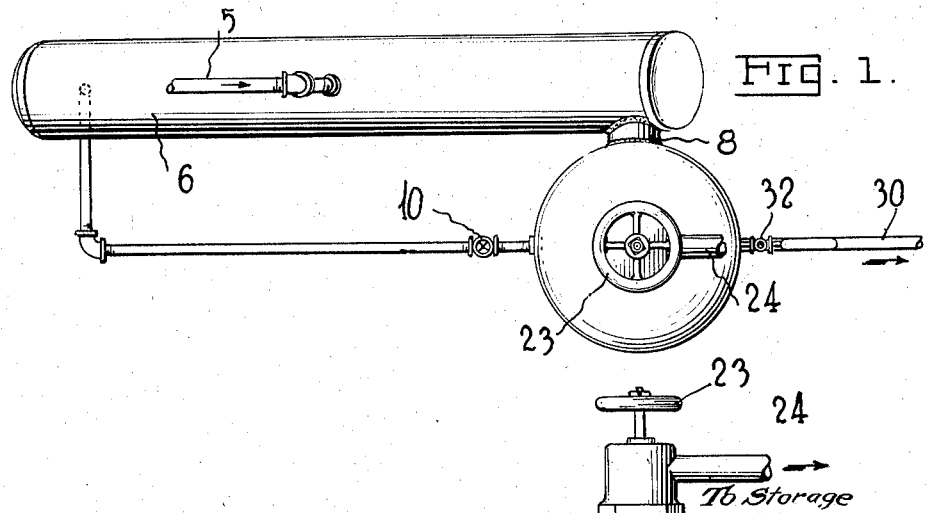
Fig. 1 is a top plan view of my improved apparatus.
Figure 2:
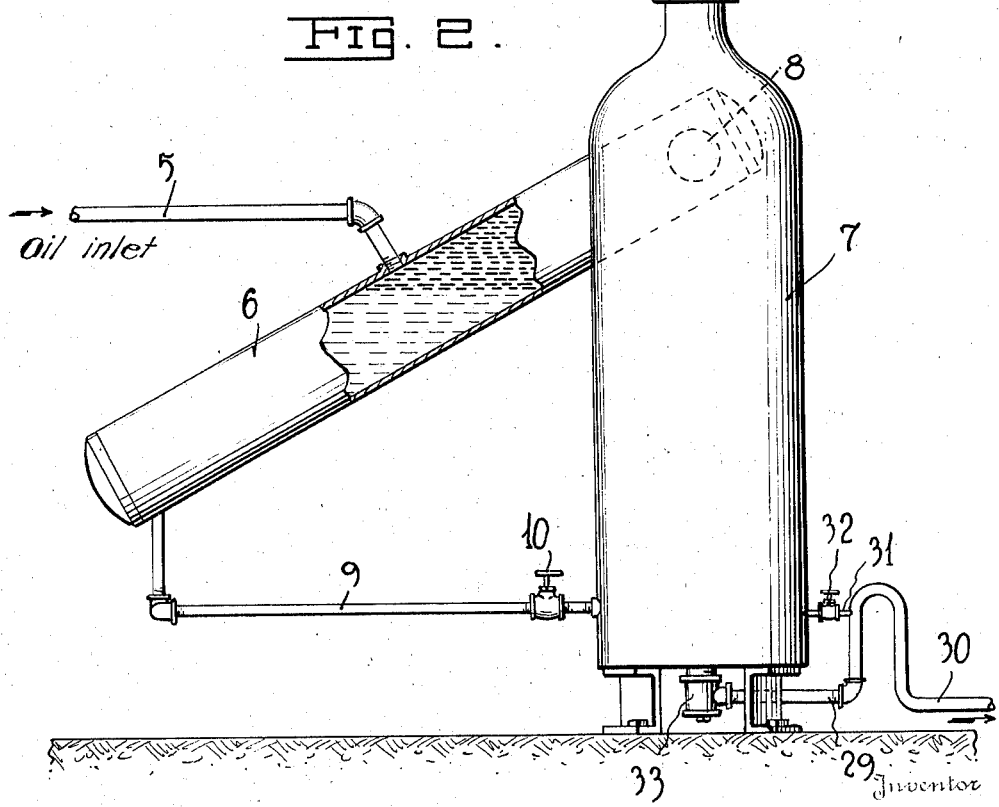
Fig. 2 is a side elevation partly in vertical section.

Referring to the drawings, 5 designates a pipe through which the well fluid is discharged. In accordance with the invention this pipe is connected to an inclined tank 6 which communicates at its upper end with a vertical tank 7 by means of a connection 8. The lower end of the inclined tank is also connected to the vertical tank by means of a pipe 9 having a manually operated control valve 10.

As a mixture of oil and water enters the inclined tank, the liquids due to natural laws have a tendency to stratify and, of course, the oil tends to flow to the top while the water stays underneath. In order to control the discharge of the water and oil, I arrange a suitable float 11 (Fig. 3) or 11a (Fig. 4) in the vertical tank. As shown in Fig. 3, the float may consist of a tank adapted to be filled with oil, as indicated at 12. The tank is preferably provided with manually controlled inlet and outlet valves 13 and 14, for filling and draining the tank.

For the purpose of equalizing pressures, the tank has an upwardly extending vent pipe 15 which extends into the oil space of the vertical chamber 7.

The float 11 controls, by any suitable means, the discharge of water and oil from the vertical tank. For this purpose the float may be provided with a rod 16 forming upper and lower substantially needle valve heads 17 and 18. The head 17 forms the movable member of an oil choke, and it cooperates with an adjustable seat 19 which may be raised or lowered by any suitable means. For example, the seat may consist of a tubular rod 20, having threaded engagement with partition 21 having a threaded bore, positioned in the oil outlet tube 22 that is located at the top of the vertical tank. A handle 23 is positioned at the upper end of the rod for the purpose of turning the same.

Oil flowing from the top of the tank 7 is discharged through a pipe 24.

The choke for the water is provided by a tubular member 25 which preferably has threaded engagement, as shown at 26, with a sleeve 27, fixed to the bottom 28 of the vertical tank.

The water flows from the bottom of the vertical tank through a pipe 29 having an inverted U-shaped trap section 30, which is preferably connected to the side of the tank 7 by a pipe 31 having a hand-operated valve 32. This feature will take care of the discharge of water from the tank 7, and will facilitate the flow of the well in case pressure should drop in the latter.

The pipe 29 is preferably connected with the sleeve 27 by means of a T 33 having a removable plug 34.

In the modification shown in Fig. 4 the float tank 11a is weighted with any suitable weighting material 11b, and for pressure equalizing purposes, the float tank has an upwardly extending tube 11c which extends into a sealed chamber 11d that communicates with the interior of the vertical tank 7a by means of a port 11e. As the chamber 11d is sealed, it will be understood that liquid will be prevented from rising therein to a level where it could flow into the tube 11c due to the fact that gas will be trapped in the upper end of the chamber 11d.

In operation the float tank will be filled with oil (Fig. 3) of the same gravity as the oil flowing from the well and consequently if the amount of water in the tank 7 reaches a predetermined elevation, the float will rise and open the needle valve 18 to cause the water to be discharged under the pressure existing in the tank 7. On the other hand when the water level falls, the float will descend and this will cause the valve 18 to close and the valve 17 to open. Of course, any gas produced by the well will be discharged with the oil through the pipe 24. It will also be obvious that the equipment will be built to withstand the high pressures encountered in controlling various wells, and while the device is particularly useful with wells flowing under natural pressure, it will be manifest that it may be employed with pumped wells.

The herein described and illustrated embodiments have given satisfactory results, and it will be apparent to those skilled in the art, after an understanding of my invention, that other changes and modifications may be made without departing from the spirit and scope of the invention, and it is intended that all matters contained in the above description or shown in the drawings should be interpreted as illustrative and not in a limiting sense.

What I claim and desire to secure by Letters Patent is:

1. In well control equipment, tank means of sufficient capacity to receive the flow from a well and comprising a vertical tank and an inclined separating tank, means placing the upper portion of the inclined tank in communication with the upper portion of the vertical tank, means placing the lower portion of the inclined tank in communication with the lower portion of the vertical tank, means for introducing the well flow into the medial portion of said inclined tank, an outlet valve for oil and an outlet valve for water arranged respectively at the upper and lower end portions of the vertical tank, and a float in the vertical tank operatively connected to the valves for controlling them.

2. In well control equipment, tank means of sufficient capacity to receive the flow from a well and comprising a vertical tank and an inclined separating tank, means placing the upper portion of the inclined tank in communication with the upper portion of the vertical tank, means placing the lower portion of the inclined tank in communication with the lower portion of the vertical tank, means for introducing the well flow into the medial portion of said inclined tank, an outlet valve for oil and an outlet valve for water arranged respectively at the upper and lower end portions of the vertical tank, a float in the vertical tank operatively connected to the valves for controlling them, and a third valve for controlling the communication between the lower portion of the inclined tank and the vertical tank.

3. In well control equipment, tank means of sufficient capacity to receive the flow from a well and comprising a vertical tank and an inclined separating tank, means placing the upper portion of the inclined tank in communication with the upper portion of the vertical tank, means placing the lower portion of the inclined tank in communication with the lower portion of the vertical tank, means for introducing the well flow into the medial portion of said inclined tank, an outlet valve for oil and an outlet valve for water arranged respectively at the upper and lower end portions of the vertical tank, a float in the vertical tank operatively connected to the valves for controlling them, a water outlet pipe controlled by the outlet valve for the water, and an inverted U-shaped trap section interposed in said pipe.

4. In well control equipment, tank means of sufficient capacity to receive the flow from a well and comprising a vertical tank and an inclined separating tank, means placing the upper portion of the inclined tank in communication with the upper portion of the vertical tank, means placing the lower portion of the inclined tank in communication with the lower portion of the vertical tank, means for introducing the well flow into the medial portion of said inclined tank, an outlet valve for oil and an outlet valve for water arranged respectively at the upper and lower end portions of the vertical tank, a float in the vertical tank operatively connected to the valves for controlling them, a water outlet pipe controlled by the outlet valve for the water, an inverted U-shaped trap section interposed in said outlet pipe, and a valve-controlled tube connecting the upper portion of the trap section to the vertical tank.

5. In well control equipment, tank means adapted to receive the flow from a well, an outlet valve for oil and an outlet valve for water operatively connected to the tank means, a float operatively connected to the valves for controlling them, an outlet pipe for water connected to the lower portion of the tank means and controlled by the water valve, an inverted U-shaped trap section interposed in said outlet pipe, and a valve-controlled tube connecting the upper portion of said trap section to the tank means.

6. A device of the character described, comprising tank means of sufficient capacity to receive the flow from a well and comprising a float tank and an inclined separating tank, means placing the upper portion of the inclined tank in communication with the upper portion of the float tank, means placing the lower portion of the inclined tank in communication with the lower portion of the float tank, a flow line for introducing the well flow into the medial portion of the inclined tank, said inclined tank being of relatively large internal diameter compared with the internal diameter of said flow line to permit separation of oil and water, an oil and gas outlet at the upper end of said float tank, a water outlet adjacent the lower end of said float tank, valve seats in said outlets, float means in the float tank, and valves carried by the float means and cooperating with said seats to control the flow of oil from the upper end of the float tank and the flow of water from the lower end of the float tank.

CHESTER A. COMBS.